United States Patent
Hanson

Patent Number: 5,239,722
Date of Patent: Aug. 31, 1993

[54] PAN CLEANING ASSEMBLY

[75] Inventor: Douglas R. Hanson, Anoka, Minn.

[73] Assignee: Bake Star, Inc., Anoka, Minn.

[21] Appl. No.: 872,610

[22] Filed: Apr. 23, 1992

[51] Int. Cl.$^5$ .................... A47L 15/39; A46B 13/02
[52] U.S. Cl. .................................. 15/56; 15/77;
           15/88.3; 15/246; 15/256.5
[58] Field of Search ............. 15/56, 77, 88.3, 256.52,
           15/304, 48, 52.1, 55, 82, 83, 383, 23, 24, 74, 246,
           256.5

[56] References Cited
U.S. PATENT DOCUMENTS

| | | | |
|---|---|---|---|
| 3,909,864 | 10/1975 | Tanaka et al. | 15/256.52 |
| 3,999,238 | 12/1976 | Hanson | 15/56 |
| 4,113,376 | 9/1978 | Rodda | 15/256.52 |
| 4,123,154 | 10/1978 | Fisher | 15/256.52 |
| 4,403,365 | 9/1983 | Hanson | 15/56 |
| 4,774,737 | 10/1988 | Hanson | 15/56 |

Primary Examiner—Edward L. Roberts
Attorney, Agent, or Firm—Kinney & Lange

[57] ABSTRACT

A pan scrubber apparatus is provided that cleans bakery pans with displaced brush bristle action. The pan scrubber includes a moveable frame that is attached to a stationary frame. A brush is mounted to the moveable frame and has elongated bristles extending outwardly. An oscillatory drive is connected to the movable frame to oscillate the brush toward and away from the outer surfaces of the pan causing the bristles to be moved in a substantially longitudinal direction of the bristles so ends of the bristles are moved against the outer surfaces of the pan intermittently. A rotational drive is further connected to the brush to rotate the brush. A bristle contact bar placed adjacent the brush temporarily impedes rotation of the bristles to effectuate cleaning.

20 Claims, 7 Drawing Sheets

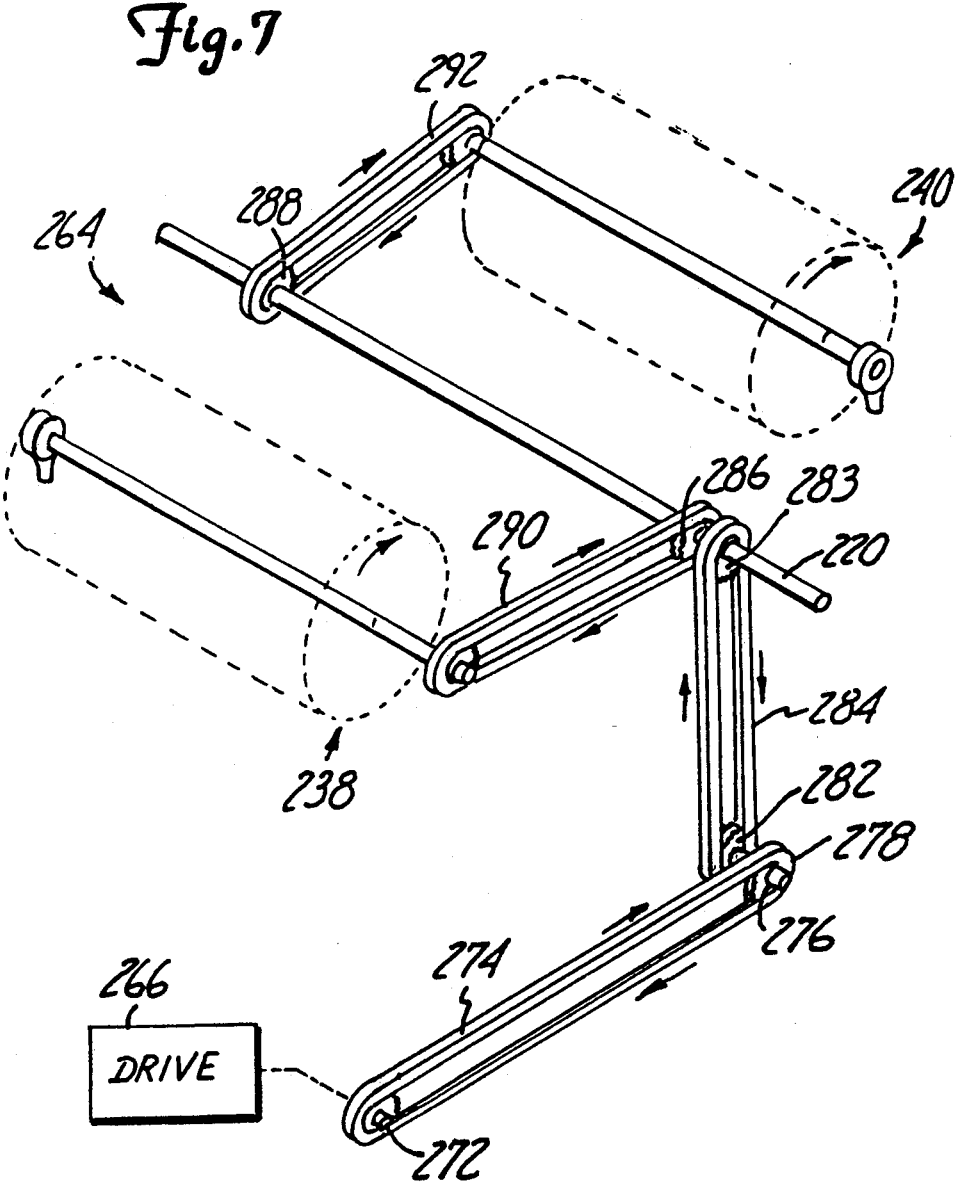

PAN CLEANING ASSEMBLY

BACKGROUND OF THE INVENTION

The present invention relates to a brush assembly for cleaning pans used in bakeries, and more particularly, to a self-cleaning brush assembly that cleans selected outer surfaces of the pans by intermittent, brush contact.

Cleaning apparatuses for cleaning pans such as bakery cake pans with a rotating brush that further reciprocates the brush bristles up and down transversely to surfaces of the pan to insure a vigorous scrubbing action have been advanced. Such brushes are used commonly to scrub the baking pan in order to loosen seeds, crust, and other material before new cake material is placed into the pan. My own U.S. Pat. No. 3,999,238 issued Dec. 28, 1976 and U.S. Pat. No. 4,403,365 issued Sep. 13, 1983 each disclose a pan cleaning apparatus. In U.S. Pat. No. 3,999,238, a reciprocating brush is oscillated back and forth to get into the corners of the pans, while a separate rotating brush is operated in a conventional manner to contact and clean major planar surfaces of the pans. U.S. Pat. No. 4,403,365 discloses a brush assembly that is mounted above a conveyor carrying the pans, and includes bristles that rotate about axes oblique with respect to the direction of travel of the pans and generally parallel to the plane of movement of the pans. The brush assembly further oscillates up and down as it rotates so that the brush tips tend to be repeatedly forced longitudinally into the corners of the pans to loosen material left in those corners. Rotation of the brush further effectuates cleaning of the pan.

SUMMARY OF THE INVENTION

The present invention relates to a self-cleaning brush type pan scrubber that cleans selected outer surfaces of pans with intermittent bristle contact. Intermittent contact of the bristles insures that any areas where baked on material may exist in the pans, such as the corners where generally upright walls are joined with the bottom of the pan, are vigorously scrubbed, while self-cleaning insures that the brush is substantially free of material over an extended period of time.

The pan scrubber includes a moveable brush assembly connected to a stationary frame. The brush assembly includes a brush having elongated bristles that extend outwardly and are positioned to engage the outer surfaces of the pan. The brush is rotated about an axis so that the bristles are sequentially positioned adjacent the outer surfaces of the pan. An obstructing member is positioned adjacent the brush for temporarily obstructing free rotation of the bristles about a brush axis such that the bristles are placed in spring tension as the brush rotates. The obstructing member releases the bristles when sufficient spring tension exists therein.

In a preferred embodiment, the obstructing member comprises a bristle contact bar mounted to the brush assembly such that rotational movement of the bristles is temporarily impeded or obstructed, placing the bristles in spring tension. When the brush has rotated a sufficient distance such that the ends of the bristles clear the bristle contact bar, the bristles spring back to their extended positions, dislodging material that is present in the brush.

In a further embodiment, an oscillatory drive is connected to the brush assembly to oscillate the brush toward and away from the outer surfaces of the pan causing the bristles that are engaging the outer pan surfaces to be moved in a substantially longitudinal direction so ends of the bristles move against the outer surfaces of the pan intermittently. Oscillatory motion of the brush is provided from a pivot arm connected to the oscillatory drive. The pivot arm is connected to an end of the brush assembly such that the brush assembly pivots with respect to a pivot shaft in a substantially vertical direction to force the bristles into the pan.

In a further embodiment, a lateral or fore and aft displacement drive is further connected to the brush assembly to move the brush laterally of the oscillator motion such that the ends of the bristles are displaced along the outer surfaces of the pan during intermittent contact with the pan. The lateral or fore and aft displacement drive comprises synchronized crank pins connected to the brush assembly with connecting rods. The crank pins are moved orbitally to initiate orbital back and forth motion of the brush bristles. The crank pins are aligned relative to each other to insure stable, substantially orbital motion of the brush assembly.

In an alternative embodiment, the pan scrubber includes two brushes that are mounted at opposite ends of a subframe having a common pivot axis. Both brushes are rotatably mounted and powered from a common rotational drive. An oscillatory drive is connected to the subframe or brush assembly to oscillate the brushes toward and away from the other surfaces of the pan. Pivoting on the common shaft, the oscillatory drive oscillates the brushes alternately in a "seesaw" manner. With the brushes located on the subframe approximately at equal distances from the common pivot shaft, the brush assembly is substantially balanced allowing relatively high oscillatory repetitions if so desired.

A blower tube is located adjacent each brush laterally across the subframe and substantially perpendicular to the direction of pan travel. The blower tubes, having apertures facing the major planar surfaces of the pan, provide compressed air at a high velocity to the pan surfaces to dislodge additional baked on material. The blower tubes are mounted on support frames that are hinged to the main frame such that in the event a pan were to partially dislocate from the conveyor and strike the blower tube, displacement of the blower tube would activate a suitable limit switch and stop the conveyor.

BRIEF DESCRIPTION OF THE DRAWINGS

FIG. 7 is a schematic representation of a rotational drive distribution system.

DETAILED DESCRIPTION OF THE PREFERRED EMBODIMENTS

Figure 1:
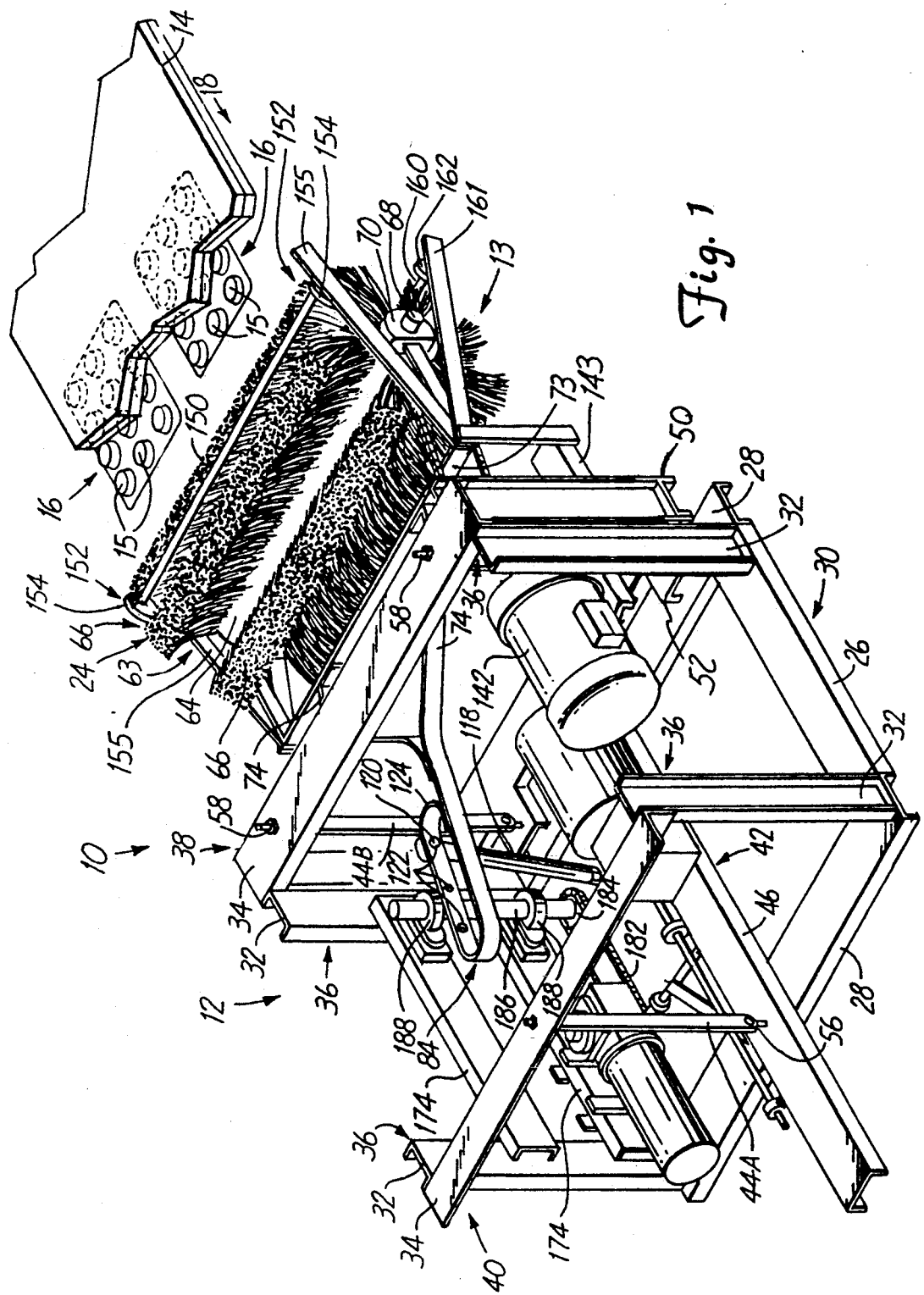
FIG. 1 is a perspective view of a pan scrubbing machine made according to the present invention positioned adjacent a pan conveyor.

A pan cleaning or pan scrubbing machine indicated generally at 10 in FIG. 1 is positioned adjacent a conveyor 14 used to support baking pans shown generally at 16 moving in a direction or path of travel as indicated by arrow 18. Pan scrubber 10 is placed in front of a pan washing machine, not shown, that washes the baking pans 16. Pan scrubber 10 removes crust and other material remaining in pan receptacles 15 before the pan is washed, preventing such material from being washed into the sewer. Pan scrubber 10 includes a main stationary frame 12 and a movable brush assembly 13. Pan scrubber 10 is positioned adjacent conveyor 14 such that brush assembly 13 coincides with a portion of conveyor 14. Brush assembly 13 includes scrubbing brush portions 24 which intermittently contact the outer surfaces of pans 16 to remove the baked on solid particles.

Main frame 12 includes longitudinal support members 26 and lateral support members 28 that form a base support 30. Upstandinq vertical support columns 32 are secured to base support 30. Upper cross beams 34 are connected at upper ends 36 of vertical support columns 32 to define a front support member 38 and a rear support member 40.

Figure 3:
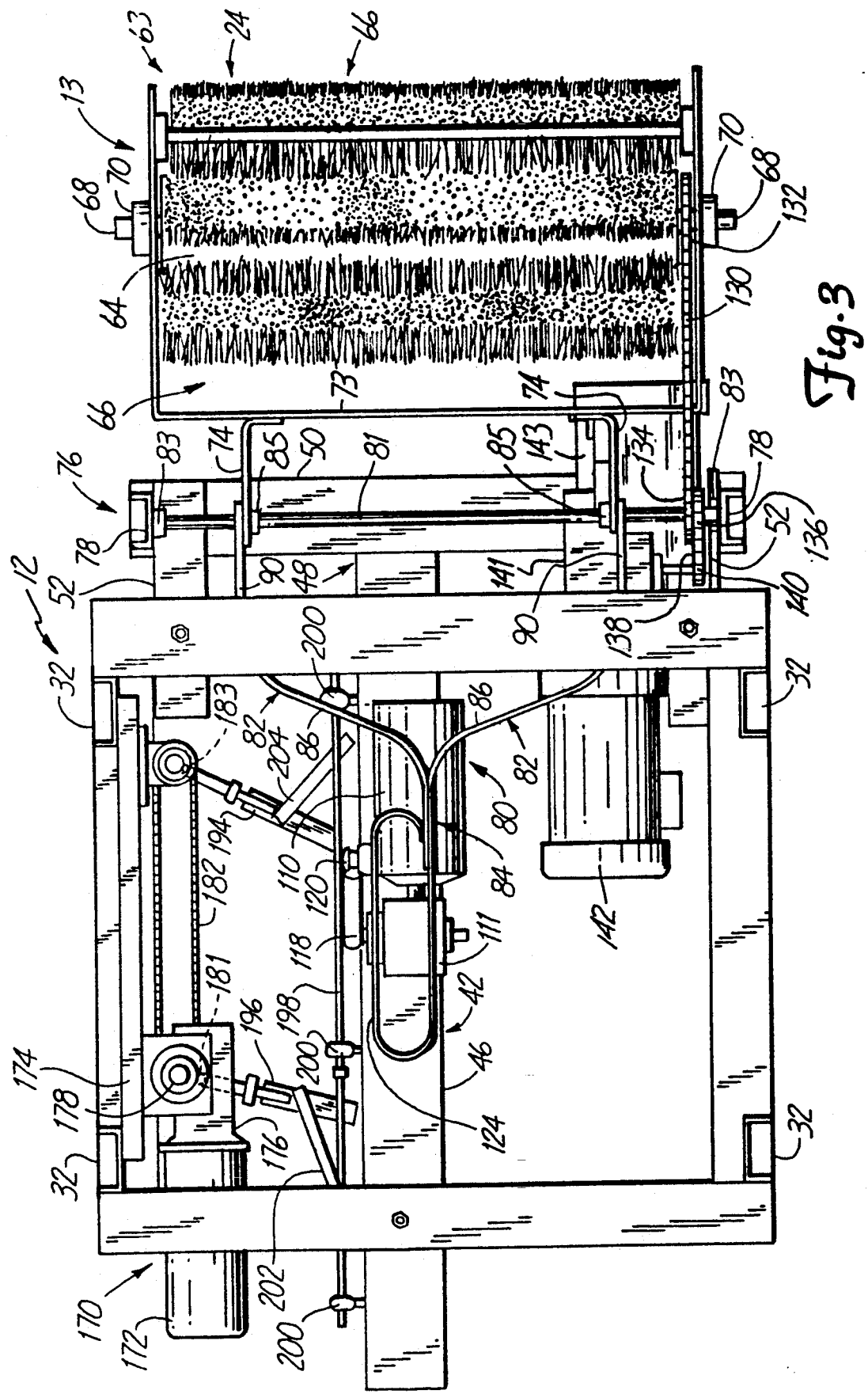
FIG. 3 is top plan view of the pan scrubbing machine shown in FIG. 1.
Figure 4:
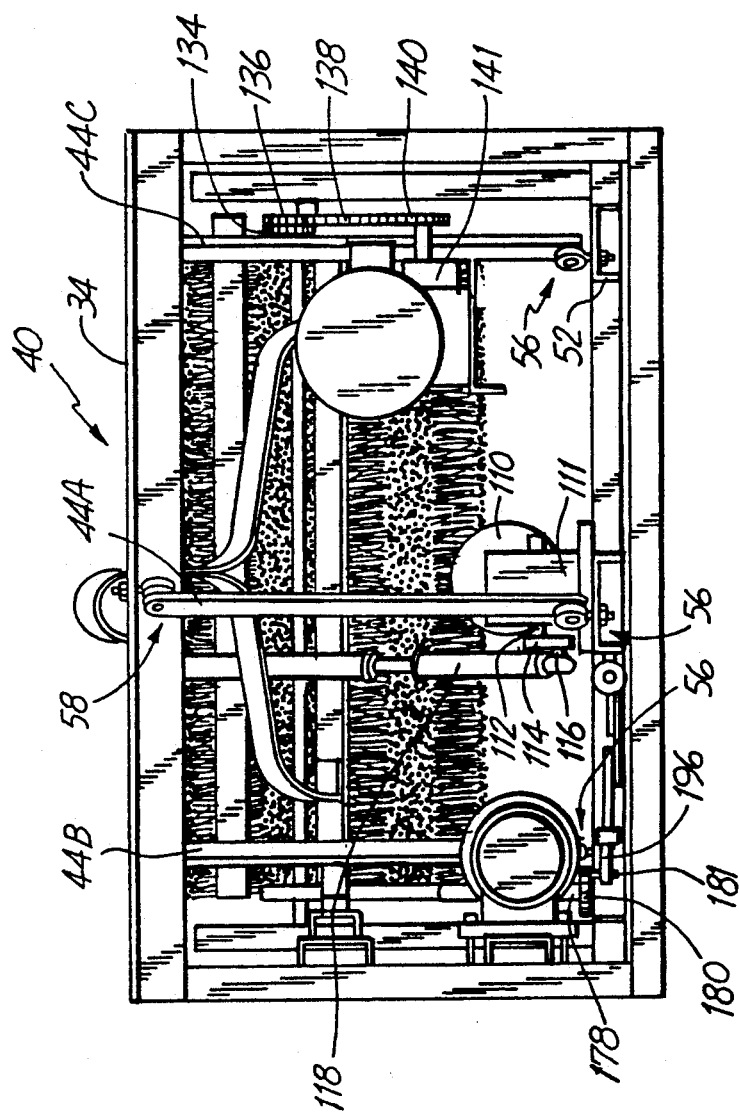
FIG. 4 is a rear view of the pan scrubbing machine shown in FIG. 1.

The movable brush assembly 13 is suspended from front support member 38 and rear support member 40 by universally pivotal suspension arms 44A, 44B and 44C, shown in FIG. 4. Referring to FIGS. 1 and 3, a lower support frame 42 for brush assembly 13 includes a center support beam 46 suspended above base support 30, between vertical columns 32, substantially in the center of lateral support members 28. Beam 46 is secured at a forward end 48 to a cross beam 50. Suspension support beams 52 are secured to cross beam 50 and extend rearwardly on opposite sides of center support beam 46.

As stated above, brush assembly 13 is suspended from front support member 38 and rear support member 40 with suspension arms 44A, 44B and 44C. In the embodiment as shown, rear suspension arm 44A is connected to a rear portion of center support beam 46 with a part spherical and end pivotal support joint 56. A similar pivotal support joint 58, shown in FIG. 4, is located at an upper end of suspension arm 44A and is in turn connected to cross beam 34 of the rear support member 40. Suspension arms 44B and 44C having similar lower spherical and end pivotal connection joints 56 connected to suspension support beams 52 and upper pivotal connection joints 58 connected to a cross beam 34 of front support member 38 to support the front portion of lower frame 42. Pivotal joints 56 and 58 permit universal swiveling of suspension arms 44A, 44B and 44C and substantially lateral, fore and aft displacement of lower frame 42 above support base 30.

Scrubbing brush portions 24 of brush assembly 13 are shown in detail in FIG. 3. Brush assembly 13 includes a brush 63 having a cylindrical brush core 64 and elongated resilient bristles 66 extending therefrom of preferably nylon or formed from other synthetic materials. Brush core 64 is mounted on a shaft 68 that is supported on suitable bearings 70 that in turn are each connected to a support bracket 73. Bracket 73 is connected to forward support arms 74. Each support arm 74 is pivotally connected to a brush support frame 76, which thus allows the brush 63 to oscillate up and down to effectuate cleaning of the pan with elongated bristles 66. Support frame 76 comprises upwardly extending vertical columns 78 secured at lower ends thereof to cross beam 50. A pivot shaft 81 extends between the upper ends of vertical columns 78 and is mounted on suitable bearings 83 which allow pivot shaft 81 to pivot. Support arms 74 are supported on pivot shaft 81 with suitable bearings 85 allowing the pivot shaft 81 to rotate therein.

A pivot control arm 80 (FIG. 3) connected to support arms 74 initiates up and down reciprocal motion of brush 63. Pivot control arm 80 is bifurcated and has a pair of support arms 82 which taper together along portions 86 and which are connected together at rear ends thereof to form a pivot control arm base 84. Pivot arms 80 have forward ends 90 connected to each respective support arm 74.

Referring to FIGS. 3 and 4, it can be seen that a motor 110 and gear reducer 111 drive the pivot arm 80 reciprocally up and down. Motor 110 and gear reducer 111 are mounted on center support beam 46 and have an output shaft 112 that mounts a crank 114. Crank 114 includes a crank pin 116 that is connected with a suitable bearing to a connecting rod 118. As shown in FIG. 1, the connecting rod 118 in turn has a pin 120 that is connected through an aperture 122 in pivot control arm base 84. Energization of motor 110 causes crank 114 to be driven, reciprocating the crank pin 116 and the attached connecting rod 118. Reciprocal or oscillatory motion of connecting rod 118 in turn causes vertical displacement of pivot arm base 84 about pivot shaft 81. With brush support arms 74 connected to pivot support arms 82, the brush 63 of brush assembly 13 will undergo vertical displacement opposite to that of pivot arm base 84 so that the ends of the bristles 66 make intermittent contact with the outer surfaces of pan 16. The up and down ("poking") cleaning action of bristles 66 will loosen material attached to the outer surfaces of pan 16. Vertical or up and down displacement of bristles 66 is adjusted by relocating connecting rod 118 to a different aperture 122 provided in a bracket 124 of pivot arm base 84. For example, maximum vertical displacement of bristles 66 is obtained with the connecting rod 118 attached to bracket 124 in the aperture 122 closest to pivot shaft 81. If, however, the vertical displacement of bristles 66 is to be decreased, connecting rod 118 would be connected to bracket 124 through a corresponding aperture 122 at increasing distances away from pivot shaft 81. In the embodiment as shown, oscillatory vertical displacement of brush 63 is approximately 90 cycles per minute. The time period for each cycle may be increased or decreased by decreasing or increasing the operating speed of motor 110 or by selecting an appropriate gear ratio through reducer 111.

Figure 2:
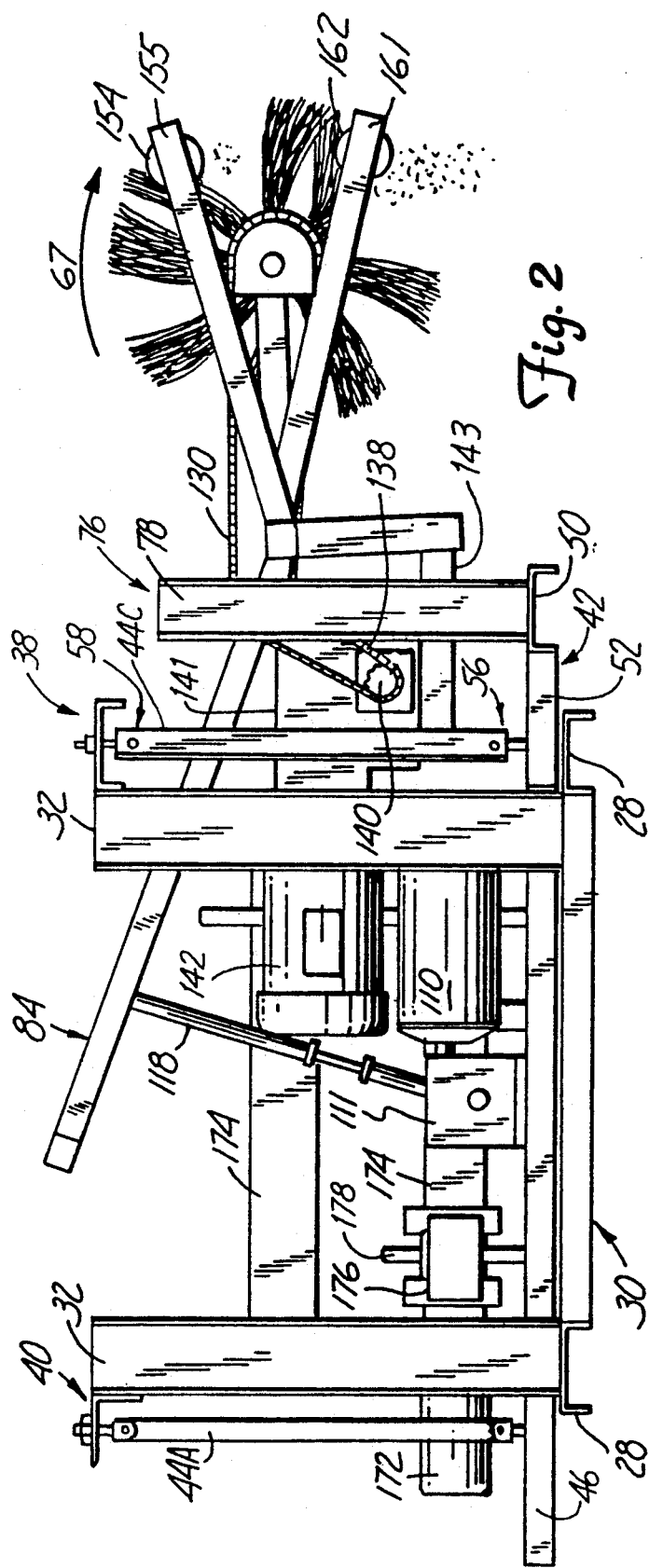
FIG. 2 is a side view of the pan scrubbing machine shown in FIG. 1.

In addition to up-down vertical displacement, the brush 63 is rotated, as indicated by arrow 67 in FIG. 2, to provide a brushing action with bristles 66 for the outer surfaces of pan 16. Referring to FIG. 3, a sprocket 132 attached to brush shaft 68 is driven with a chain 130. Chain 130 is connected to a sprocket 134 mounted on pivot shaft 81. Referring to FIG. 4, sprocket 134 is secured to a sprocket 136. Sprocket 136 in turn is connected to drive sprocket 140 of a gear reducer 141 with a chain 138. As shown in FIG. 2, reducer 141 and a drive motor 142 are mounted to a beam 143 that is supported from brush assembly 13. In the embodiment as shown, when the motor 142 is powered, the bristles 66 rotate against the direction of pan travel when contact is made with the pan 16. Speed of rotation is approximately 16-20 revolutions per minute and is controlled directly by motor 142 or by appropriate gear reduction through reducer 141.

Referring to FIG. 1, brush assembly 13 includes an upper bristle contact bar 150. Upper bristle contact bar 150 is mounted on ends 152 thereof with suitable bearings 154 to brush support plates 155. Upper bristle contact bar 150 is positioned a selected radial distance from shaft 68 that is less than the radial distance of the outer ends of the bristles 66 such that free rotation of the bristles 66 is temporarily impeded or obstructed by contact with bristle bar 150. With continued rotation of the brush 63, the bristles 66 slide along the outer surface of the bristle contact bar 150, bending each bristle with a spring tension. After the brush 63 has rotated such that the respective ends of the bristles 66 clear the bristle contact bar 150, the bristles 66 spring back to their radial positions dislodging material present within the brush 63. Bristle bar 150 rotates on bearings 154 to minimize wear on the bristles 66.

In the embodiment as shown, a lower bristle contact bar 160 similar to that of upper bristle contact bar 150 is also mounted adjacent to brush 63 with lower support plates 161 and bearings 162. Bristle contact bar 160 further dislodges material from the bristles 66 in a manner similar to that as described with bristle contact bar 150. Material dislodged by bristle contact bars 150 or 160 falls below the brush assembly 13 to be collected and discarded.

In addition to rotating and oscillating up and down, the brush 63 is displaced substantially in directions along the major planar surfaces of the pane 16. Lateral displacement of brush assembly 13 in turn causes the bristle ends of the brush 63 to also displace laterally. Displacement of the ends of the bristles 66 laterally in conjunction with intermittent contact of the ends of the bristle 66 from the oscillatory movement described above effectively removes baking products that have adhered to pan receptacles 15.

A lateral or fore and aft displacement drive 170 is illustrated in detail in FIG. 3. The displacement drive 170 includes a motor 172 that is mounted to stationary main frame 12 on suitable supports 174 extending between and fastened to upstanding vertical support columns 23. An output shaft from motor 172 is connected to a speed reducer 176 that has an output shaft 178 with a drive sprocket 180, shown in FIG. 4, drivably mounted thereon. Drive sprocket 180 drives a chain 182 that in turn drives a sprocket 184, shown in FIG. 1. Sprocket 184 is attached to and rotates with an idler shaft 186. Shaft 186 rotates on suitable bearings 188 that are secured to support beams 174 with conventional mounts.

Referring to FIG. 3, sprockets 180 and 184 have crank pins 181 and 183, respectively, mounted thereon that are connected to ends of drive rods 194 and 196 through suitable bearings. At ends opposite sprockets 180 and 184, drive rods 194 and 196 are universally pivotally attached to a bar 198. Bar 198 is attached to center beam 46 with pivotal connections 200. Universal pivotal connections 200 (rod and bearings) allow bar 198 to rotate slightly about its longitudinal axis when the beam 46 is moved back and forth in each direction. Angled braces 202 and 204 attached to bar 198 provide additional support to drive rods 196 and 194, respectively.

As described above, brush assembly 3 is suspended from stationary frame 12 with fairly long suspension arms 44A, 44B and 44C. Thus, when the motor 172 is energized causing the sprockets to rotate, one end of the respective drive rods 194 and 196 rotate with crank pins 181 and 183 and displace brush assembly 13 as guided by the suspension arms 44A, 44B and 44C laterally of the oscillatory motion. The lateral motion is at least partially back and forth in direction of movement of the conveyor carrying the baking pans. Although fore and aft displacement of brush assembly 13 can be controlled with a single crank pin 181 and connecting rod 196, use of the second crank pin 183 and second connecting rod 194 mounted to center beam 46 at a location spaced away from connecting rod 196 provides more stable movement and support of brush assembly 13. In the embodiment as shown, crank pins 181 and 183 are located on sprockets 180 and 184 at the same angular position so that they move in synchronization and thus initiate substantially orbital motion of brush assembly 13. Orbital oscillation is adjustable from 0-250 cycles per minute and is controlled directly by motor 172 and by appropriate adjustable speed reduction through reducer 176.

Figure 5:
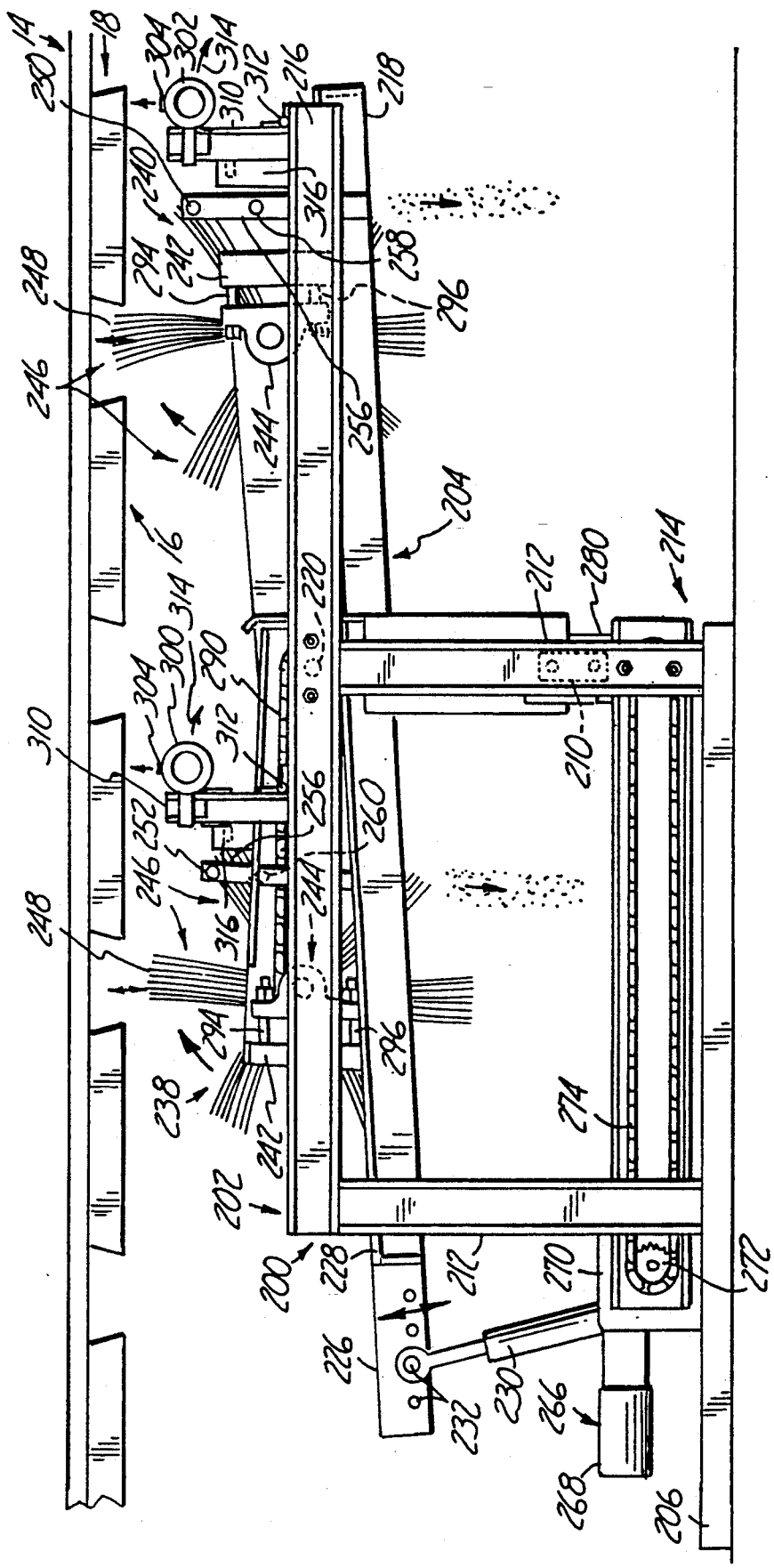
FIG. 5 is a side view of a second embodiment of a pan scrubbing machine made according to the present invention positioned adjacent a pan conveyor.

A second embodiment of a self-cleaning pan cleaning or tray scrubbing machine of the present invention is indicated generally at 200 in FIG. 5. The scrubbing machine 200 is positioned adjacent the conveyor 14 used to support baking pans shown generally at 16 moving in a direction or path of travel as indicated by an arrow 18. The pans 16 are inverted and held on the conveyors in a suitable manner.

The pan scrubber 200 includes a main stationary frame 202 and a movable brush assembly 204. The main frame 202 has longitudinal support rails 206 and lateral support members 208 and 210 (shown in FIG. 6) that form a support base 214. Lateral support 210 is mounted to the vertical support columns 212 above the floor to allow material removed from the pans and deposited from a rotating brush described below to be removed easily. Upstanding vertical support columns 212 are secured to the base support 214. Upper longitudinal beams 216 are connected to the upper ends of the vertical support columns 212.

Figure 6:
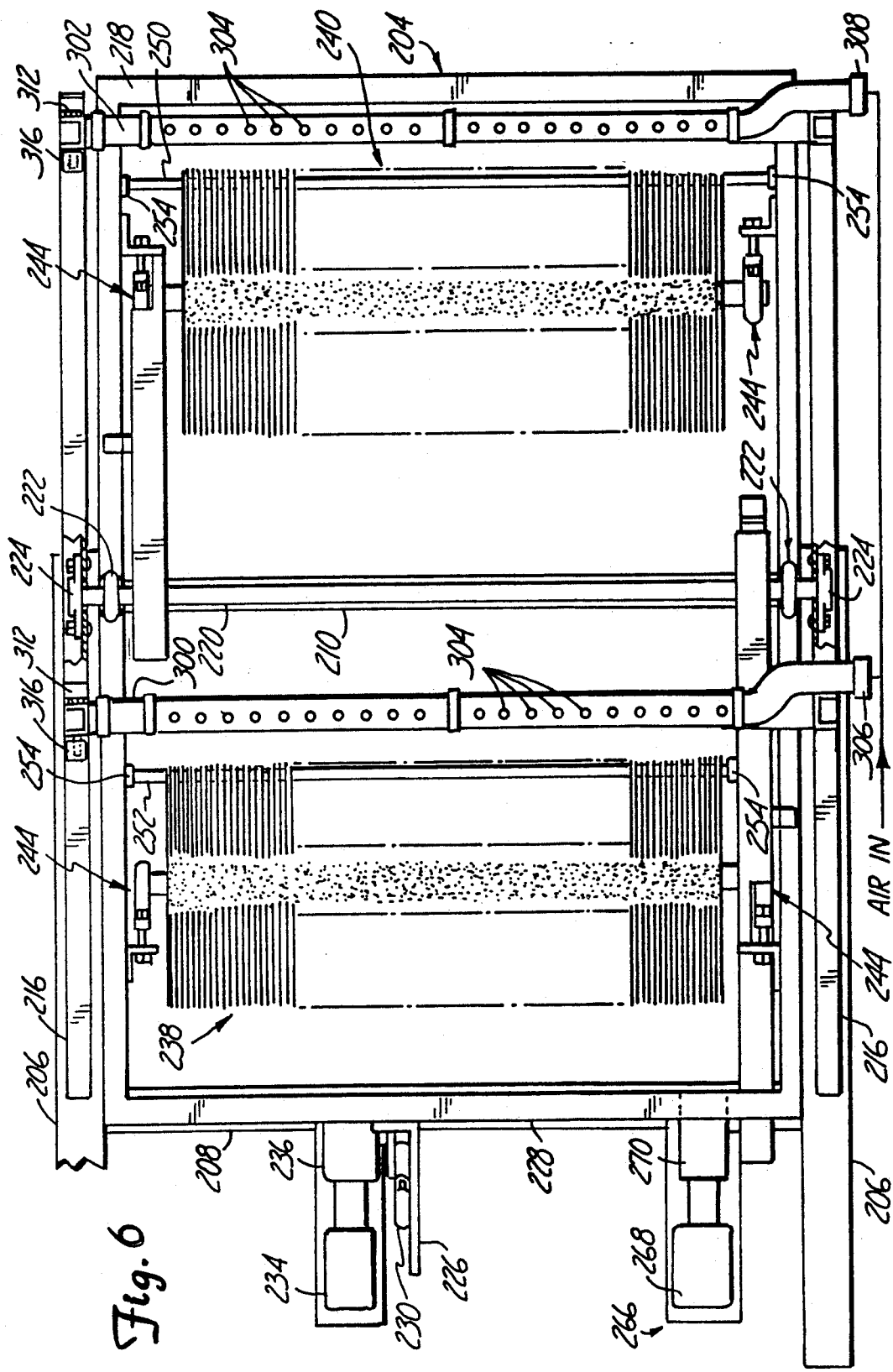
FIG. 6 is a partial top plan view of the pan scrubbing machine shown in FIG. 5.

The movable brush assembly 204 includes a box subframe 218 that is pivotally secured between the upper beams 216. As illustrated in FIG. 6, the subframe 218 is mounted to a pivot shaft 220 using suitable bearings 222 mounted approximately at the longitudinal midpoint of the subframe 218. The ends of the pivot shaft 220 extend into suitable bearings 224 in upper beams 216. With the subframe 218 mounted at its approximate longitudinal midpoint, when the subframe is pivoted, each end of the subframe 218 alternates in direction of movement which is opposite from the direction of movement of the other end.

A pivot control arm 226 connected to the subframe 218 on a lateral crossbeam 228 thereof initiates up and down reciprocal motion of the brush assembly 204. A connecting rod 230 is pivotally connected to the pivot control arm 226 through a pin or bolt extending through one of a plurality of apertures 232, shown in FIG. 5, therein. A motor 234 and a gear reducer 236, shown in FIG. 6, mounted to the base support 214 and having a conventional crank and crank pin, connect to the connecting rod 230 at an end opposite the pivot control arm 226. Energization of the motor 234 causes the crank to be driven, reciprocating the attached connecting rod 230. Reciprocal or oscillatory motion of the connecting rod 230 in turn causes alternating substantially vertical displacement of each end of the subframe 218. Vertical or up and down displacement of the subframe 218 is adjusted by relocating the connecting rod 230 to a different aperture 232 provided in the pivot control arm 226.

Rotating brushes 238 and 240 are mounted at each end of the subframe 218 on upstanding vertical support columns 242 with suitable bearings 244. As illustrated in FIG. 5, the brushes 238 and 240 are similar to the brush 63 illustrated in FIG. 1 in that each brush comprises scrubbing portions 246 formed from elongated resilient, nylon bristles 248 that extend from a cylindrical brush core. The bristles will bend, but they become spring loaded as they bend. As illustrated in FIGS. 5 and 6, the brushes are mounted to the subframe at approximately equal distances from the pivot shaft 220 such that the brush assembly 204 is substantially balanced, therefore allowing brush assembly 204 to oscillate about pivot shaft 220 at increased repetition rates.

Referring to FIG. 5, the brush assembly 204 includes bristle contact bars 250 and 252 adjacent brushes 240 and 238, respectively. The bristle contact bars 250 and 252 are mounted on ends thereof with suitable bearings 254 to vertical brush support plates 256. The bristle contact bars 250 and 252 are positioned a selected radial distance from each respective brush core or axis at a distance less than the radial distance of the outer ends of the bristles 248 such that free rotation of the bristles is temporarily obstructed or impeded by contact with the bristle bars 250 and 252.

In the embodiment as shown, a second set of rotatable bristle contact bars 258 and 260 are mounted to the support plates 256 on suitable bearings, not shown. Referring to brush 240, the second bristle contact bar 258 is spaced from the first bristle contact bar 250 such that as the bristles 248 release from the first bristle contact bar 250, they will snap and strike the second bristle contact bar 258 to dislodge material from the brush 240. With continued rotation of the brush 240, the bristles 248 slide along the outer surface of the second bristle contact bar 258, bending each bristle and placing the bristle in spring tension. After the brush 240 has rotated such that the respective ends of the bristles clear the second bristle contact bar 258, the bristles spring back to their extended radial positions dislodging material present within the brush 240. In like fashion, the bristle contact bar 260 is spaced from bristle contact bar 250 and the axis of brush 238 such that when the bristles 248 of brush 238 are released from bristle contact bar 252, they will strike bristle contact bar 260 with spring force so that they snap against the bar 260. The bristle bars 250, 252, 258 and 260 rotate on the bearings to minimize wear on the bristles 248.

A rotational drive system 264 illustrated schematically in FIG. 7 rotates brushes 238 and 240. The rotational drive system 264 includes a rotational drive 266, illustrated in FIGS. 5 and 6. The rotational drive 266 includes a conventionally connected motor 268 and gear reducer 270, that in series are connected to a drive sprocket 272. The drive sprocket 272 is connected to a chain 274 that in turn rotates an idler sprocket 276. Idler sprocket 276 is mounted on a shaft 278 and rotates on suitable bearings conventionally mounted to the vertical support column 280. A sprocket 282 is further mounted on shaft 278 and with a chain 284 connected to a sprocket 283 turns pivot shaft 220. Both sets of bearings 214 (on the subframe 218) and 222 (on the upper beams 216) allow the pivot shaft 220 to rotate freely. Drive sprockets 286 and 288 are connected to pivot shaft 220 and in turn rotate each brush 238 and 240 with corresponding chains 290 and 292.

As stated, each brush 238 and 240 is mounted on vertical support columns 242 with suitable bearings 244. The bearings 244 are each supported on vertical support columns 242 with two opposed mounting bolts 294 and 296, shown in FIG. 5, that have longitudinal lengths substantially parallel to longitudinal lengths of the drive chains 290 and 292. With the mounting bolts 294 and 296 oriented as shown in FIG. 5, the brushes 238 and 240 can be removed from the brush assembly 204 inwardly toward the pivot shaft 220 without breaking or disconnecting the chains 290 and 292 at their master links, thus allowing the brushes to be replaced easily when so desired.

Blower tubes 300 and 302 are located adjacent each brush 238 and 240 laterally across upper beams 216 and substantially perpendicular to the direction of pan travel 18. The blower tubes 300 and 302 include apertures 304 facing the major planar surfaces of the pans to provide compressed air at a high velocity to the pan surfaces to dislodge additional baked on material from the pans 16. Compressed air is provided to each blower tube 300 and 302 on ends 306 and 308 (shown in FIG. 6), respectively, from a suitable blower, not shown. Referring to FIG. 5, the blower tubes 300 and 302 are mounted to vertical support brackets 310 that in turn are connected to the upper beams 216 with hinges 312. The hinges 312 allow the blower tubes 300 and 302 and corresponding vertical support brackets 310 to displace angularly as indicated by arrows 314 in case a pan strikes either blower tube after being partially dislocated from the conveyor 14.

Suitable limit or stop switches 316 are supported on the frame adjacent and connected to the vertical support brackets 310. The switches 316 allow normal operation of the conveyor 14 when the vertical support brackets 310 are substantially upright. However, upon sufficient angular displacement of the vertical support brackets 310, the switches 316 stop the conveyor 14.

In both embodiments, the conveyor 14 is an endless belt with the scrubbers 10 or 200 below the lower length of the belt as shown in FIGS. 1 and 5. The pans 16 are inverted as the brushes clean material from the pans and the material drops downward. The pans 16 are held fixed onto the conveyor 14 and as illustrated are on their return trip after the baking product has been removed. The pans 16 will be carried to an end of the conveyor 14, and pass around an end roller, not shown, to an upper conveyor portion, not shown, where the pan is filled and passed through the oven after which, the product is removed and the pans 16 again are inverted and moved over the scrubbers 10 or scrubber 200.

Although the present invention has been described with reference to preferred embodiments, workers skilled in the art will recognize that changes may be made in form and detail without departing from the spirit and scope of the invention.

What is claimed is:

1. An apparatus for scrubbing outer surfaces of a pan, the apparatus comprising:
   a frame;
   brush means mounted on the frame, the brush means having elongated bristles extending outwardly from a brush axis in position to engage the outer surfaces of the pan;
   first power means connected to the brush means to oscillate the brush means toward and away from the outer surfaces of the pan, the first power means causing bristles that are engaging the outer pan surfaces to be moved in a substantially longitudinal direction with ends of the bristles moved against the outer surfaces of the pan intermittently;

second power means connected to the brush means to rotate the brush means on the brush axis; and a bristled contact bar being rotatable on a bar longitudinal axis, the bristle contact bar being mounted adjacent the brush means at a selected radial distance from the brush axis to temporarily obstruct free rotation of the bristles about the brush axis such that the bristles are bent and placed in spring tension as the brush means rotates, the bristles contact bar releasing the bristles when sufficient spring tension exists therein.

2. The apparatus of claim 1 and further comprising third power means connected to the brush means to move the brush means and displace the ends of the bristles engaging the outer surfaces of the pan along the outer surfaces of the pan laterally of the oscillatory movement during the intermittent contact of the ends of the bristles with the outer surfaces of the pan.

3. The apparatus as specified in claim 2 wherein the generally lateral movement of the brush means is orbital.

4. The apparatus as specified in claim 1 wherein the first power means oscillates the brush means for intermittent contact of the ends of the bristles with the outer surfaces of the pan at the same time as the brush means rotates.

5. The apparatus of claim 1 wherein the frame is a stationary frame, wherein the brush means comprises a moveable frame, and a first and second rotatable brush mounted to the moveable frame at spaced apart locations and rotated by the rotational means, the first brush rotated on the first mentioned axis and the second brush rotated on a second brush axis, and wherein the moveable frame is pivotally connected to the stationary frame between the brushes.

6. The apparatus as specified in claim 1 and further comprising obstruction means mounted to the frame, the obstruction means being spaced apart from the bristle contact bar such that the bristles strike the obstruction means with spring tension when released from the bristle contact bar.

7. The apparatus as specified in claim 6 wherein the obstruction means comprises a second bristle contact bar having a second longitudinal bar axis, the second bristle contact bar being mounted adjacent the brush at a selected radial distance from the brush axis.

8. The apparatus for scrubbing outer surfaces of a pan, the apparatus comprising:

a stationary frame;

a moveable frame pivotally connected to the stationary frame;

a brush mounted to the moveable frame, the brush having elongated bristles extending outwardly from a brush axis in position to engage the outer surfaces of the pan;

oscillatory means connected to the movable frame to oscillate the brush toward and away from the outer surfaces of the pan causing bristles that are engaging the outer pan surfaces to be moved in a substantially longitudinal direction with ends of the bristles moved against the outer surfaces of the pan intermittently;

rotational means connected to the brush to rotate the brush on the brush axis; and displacement means connected to the moveable frame to move the brush such that the ends of the bristles are displaced laterally of the oscillatory movement during the intermittent contact of the ends of the bristles with the outer surfaces of the pan.

9. The apparatus as specified in claim 8 wherein the displacement means comprises a crank pin, a connecting rod connected between the crank pin and the moveable frame, and drive means to move the crank pin.

10. The apparatus as specified in claim 9 wherein the displacement means further comprises a second crank pin and a second connecting rod connected to the second crank pin and the moveable frame at a point spaced apart from the first connecting rod, the drive means further moving the second crank pin.

11. The apparatus as specified in claim 8 and further comprising a blower tube mounted to the stationary frame adjacent the pane outer surfaces, the blower tube providing compressed air to remove material from the pan outer surfaces.

12. The apparatus as specified in claim 11 and further comprising connection means for mounting the blower tube to the frame; the connection means allowing displacement of the blower tube when stuck by a pan.

13. The apparatus as specified in claim 8 and further comprising obstruction means mounted to the moveable frame for temporarily obstructing free rotation of the bristles about the brush axis such that the bristles are placed in spring tension as the brush rotates, the obstruction means releasing the bristles when sufficient spring tension exists therein.

14. The apparatus as specified in claim 8 wherein the obstruction means comprises a bristle contact bar having a bar longitudinal axis, the bristle contact bar being mounted adjacent the brush at a selected radial distance from the brush axis.

15. The apparatus of claim 14 wherein the bristle contact bar rotates on the bar longitudinal axis.

16. A self-cleaning apparatus for cleaning the outer surfaces of a pan, the apparatus comprising:

a frame;

a brush mounted to the frame, the brush having elongated bristles extending outwardly from a brush axis in position to engage the outer surfaces of the pan;

rotational means for rotating the brush on the brush axis;

first obstruction means mounted to the frame for temporarily obstructing free rotation of the bristles about the brush axis such that the bristles are bent and placed in spring tension as the brush rotates, the first obstruction means releasing the bristles when sufficient spring tension exists therein; and second obstruction means mounted to the frame, the second obstruction means being spaced apart from the first obstruction means such that the bristles strike the second obstruction means with spring tension when released from the first obstruction means.

17. The apparatus as specified in claim 16 wherein the first obstruction means comprises a bristle contact bar having a longitudinal bar axis, the bristle bar being mounted adjacent the brush at a selected radial distance from the brush axis.

18. The apparatus as specified in claim 17 wherein the second obstruction means comprises a second bristle contact bar having a second longitudinal bar axis, the second bristle contact bar being mounted adjacent the brush at a selected radial distance from the brush axis.

19. The apparatus as specified in claim 18 wherein the first mentioned bristle contact bar rotates on the first mentioned bar axis and the second bristle contact bar rotates on the second bar axis.

20. The apparatus as specified in claim 17 wherein the first mentioned bar axis and the second bar axis are parallel to the brush axis.

* * * * *

UNITED STATES PATENT AND TRADEMARK OFFICE
CERTIFICATE OF CORRECTION

PATENT NO.  : 5,239,722
DATED       : August 31, 1993
INVENTOR(S) : Douglas R. Hanson It is certified that error appears in the above-indentified patent and that said Letters Patent is hereby corrected as shown below:

Col. 9, Line 5, delete "bristled", insert "bristle"

Col. 9, Line 49, delete "The", insert "An"

Col. 10, Line 17, delete "pane", insert "pan"

Col. 10, Line 23, delete "stuck", insert "struck"

Col. 10, Line 31, delete "claim 8", insert "claim 13"

Col. 10, Line 61, delete "bristle bar", insert "bristle contact bar"

Signed and Sealed this

Twenty-sixth Day of April, 1994

Attest:

BRUCE LEHMAN

*Attesting Officer*    *Commissioner of Patents and Trademarks*